US012463998B2

(12) United States Patent
Tyborowski et al.

(10) Patent No.: US 12,463,998 B2
(45) Date of Patent: Nov. 4, 2025

(54) SECURITY PATCH DEPLOYMENT IN RESPONSE TO DETECTING MALICIOUS NETWORK TRAFFIC

(71) Applicant: Bank of America Corporation, Charlotte, NC (US)

(72) Inventors: Camilla Tyborowski, Buffalo Grove, IL (US); Adam Kristian King, Fort Mill, SC (US); Tarani Avasarala, Aurora, CO (US); Manil Ashish Trivedi, South Riding, VA (US); Robert Hannon Sparks, Euless, TX (US); Jose Miguel Magadan, III, St. Augustine, FL (US); Elizabeth Marie Bennett, Charlotte, NC (US); Sophia Brianna Bui, Charlotte, NC (US); Rafael Josue Alfaro, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 18/339,852

(22) Filed: Jun. 22, 2023

(65) Prior Publication Data
US 2024/0430278 A1 Dec. 26, 2024

(51) Int. Cl.
*G06F 21/00* (2013.01)
*H04L 9/40* (2022.01)
*H04L 41/16* (2022.01)

(52) U.S. Cl.
CPC .......... *H04L 63/1425* (2013.01); *H04L 41/16* (2013.01); *H04L 63/02* (2013.01)

(58) Field of Classification Search
CPC ...... H04L 63/1425; H04L 41/16; H04L 63/02
See application file for complete search history.

(56) References Cited

U.S. PATENT DOCUMENTS 8,566,115 B2 10/2013 Moore
8,635,694 B2 1/2014 Malyshev et al.
(Continued)

OTHER PUBLICATIONS

Camilla Tyborowski, et al., U.S. Appl. No. 18/339,867, filed Jun. 22, 2023, "Determining a security patch for a cyber attack by executing simulations of different security protocols.".
(Continued)

*Primary Examiner* — Michael M Lee

(57) ABSTRACT

A system for detecting and addressing security threats is disclosed. The system detects incoming network traffic to a computing device. The system detects physical and digital effects of the network traffic on the computing device. The system determines that the network traffic is causing a first set of anomalies based on the physical and digital effects of the network traffic. The system compares the first set of anomalies with a second set of anomalies associated with previously known malicious network traffic. If the system determines that more than a threshold percentage of the first set of anomalies corresponds to counterpart anomalies from the second set of anomalies, the system determines that the network traffic corresponds to the malicious network traffic. The system communicates a security patch associated with the second set of anomalies and instructions that cause the security patch to be executed to the computing device.

20 Claims, 5 Drawing Sheets

(56) References Cited

U.S. PATENT DOCUMENTS

| | | | |
|---|---|---|---|
| 8,756,693 B2 | 6/2014 | Dube et al. | |
| 8,856,075 B2 | 10/2014 | Rathod | |
| 9,082,052 B2 | 7/2015 | Rodriguez | |
| 9,626,677 B2 | 4/2017 | Turgeman et al. | |
| 9,848,009 B2 | 12/2017 | Turgeman et al. | |
| 9,860,257 B1* | 1/2018 | Kumar | H04L 43/16 |
| 9,996,693 B2 | 6/2018 | Sun et al. | |
| 10,178,130 B2 | 1/2019 | Apvrille | |
| 10,826,940 B2 | 11/2020 | Narayanaswamy et al. | |
| 11,032,312 B2 | 6/2021 | Jeyakumar et al. | |
| 11,050,793 B2 | 6/2021 | Jeyakumar et al. | |
| 11,271,955 B2 | 3/2022 | Vashisht et al. | |
| 11,288,369 B1* | 3/2022 | Grzonkowski | G06F 21/57 |
| 11,431,738 B2 | 8/2022 | Jeyakumar et al. | |
| 11,477,209 B2 | 10/2022 | Jakobsson | |
| 11,550,909 B2 | 1/2023 | Ladnai et al. | |
| 2010/0180344 A1 | 7/2010 | Malyshev et al. | |
| 2012/0260342 A1 | 10/2012 | Dube et al. | |
| 2012/0260343 A1 | 10/2012 | Sun et al. | |
| 2015/0067866 A1* | 3/2015 | Ibatullin | H04L 63/0209 726/25 |
| 2015/0312268 A1* | 10/2015 | Ray | H04L 63/0227 726/23 |
| 2016/0307201 A1 | 10/2016 | Turgeman et al. | |
| 2018/0077200 A1 | 3/2018 | Apvrille | |
| 2018/0103047 A1 | 4/2018 | Turgeman et al. | |
| 2018/0218167 A1 | 8/2018 | Narayanaswamy et al. | |
| 2019/0207966 A1 | 7/2019 | Vashisht et al. | |
| 2020/0162503 A1* | 5/2020 | Shurtleff | G06F 11/3013 |
| 2020/0287922 A1* | 9/2020 | Wang | H04L 63/1416 |
| 2020/0389486 A1* | 12/2020 | Jeyakumar | H04L 63/20 |
| 2021/0029145 A1 | 1/2021 | Zhang | |
| 2023/0032874 A1 | 2/2023 | Waghorn | |
| 2023/0216870 A1* | 7/2023 | Allouche | H04L 63/1425 726/23 |

OTHER PUBLICATIONS

Markus Jakobsson, et al., "Retroactive Detection of Malware with Applications to Mobile Platforms," https://www.usenix.org/legacy/event/hotsec10/tech/full_papers/Jakobsson.pdf.

\* cited by examiner

SECURITY PATCH DEPLOYMENT IN RESPONSE TO DETECTING MALICIOUS NETWORK TRAFFIC

TECHNICAL FIELD

The present disclosure relates generally to information security, and more specifically to security patch deployment in response to detecting malicious network traffic.

BACKGROUND

With the increase in the number of users on the Internet, the number of fraudulent activities on the Internet also increases. For example, cyberattacks and malware may be launched to access and misuse information stores on computing devices at the expense of the users. Detecting and addressing cyberattacks and malware are challenging.

SUMMARY

The system described in the present disclosure is particularly integrated into practical applications of using physical and digital impressions/footprints of a cyberattack to identify the cyberattack, determine a security patch that addresses and remedies the cyberattack, and execute the determined security patch. This, in turn, provides technical improvements and advantages over the current malware and cyberattack detection techniques. These technical improvements and advantages are described below.

In an example scenario, assume that a cyberattack A was launched and targeted a user device. Cyberattack A leaves a particular set of physical and digital impressions/footprints on the user device. For example, cyberattack A may increase the internal thermal reading of the user device by a certain amount (e.g., by 2.9 degrees, 3.3 degrees, etc.), increase the fan speed by a certain amount (e.g., by 50 rounds per minute (RPM), 60 RPM, etc.), increase the electricity consumption by a certain percentage (e.g., by 20%, 30%, etc.), increase memory utilization by a certain percentage (e.g., by 20%, 30, etc.), increase hard disk engagement by a certain amount (e.g., by 20%, 30%, etc.), cause abnormal timestamps or event be recorded, among physical and digital impressions/footprint.

The current malware and cyberattack detection techniques are not configured to use the physical and digital impressions of a cyberattack to identify and classify the cyberattack and determine an appropriate security patch that addresses or remedies the cyberattack. Furthermore, the current malware and cyberattack detection techniques are retroactive-meaning that after the attack has done its intended damage to user devices, the cyberattack can be detected and addressed. The current malware and cyberattack detection techniques suffer from several drawbacks. For example, because the current malware and cyberattack detection techniques are retroactive, the security of user devices and information stored in the user devices is already compromised by the cyberattack.

The present disclosure contemplates unconventional systems and methods to detect the physical and digital impressions of cyberattacks on user devices, create a training dataset that comprises the detected physical and digital impressions of the cyberattacks, train a machine learning algorithm using the training dataset to identify a cyberattack based on respective physical and digital impressions on a user device by cross-referencing the detected physical and digital impressions with each entry in the training dataset, identify a security patch associated with a previously-classified and identified cyberattack from the training dataset, and deploy and install the security patch on the user device. In this manner, the disclosed system is configured to learn from the training dataset and cyberattacks (using supervised, unsupervised, and/or semi-supervised learning) and proactively detect cyberattacks before a cyberattack has a change to infect a user device, access information stored at the user device, or misuse the information stored at the user device. The disclosed system may then recommend, deploy, install, and/or execute a security patch that is determined to address and remedy the cyberattack. Accordingly, the disclosed system provides a practical application and technical improvement of proactively detecting a cyberattack and deploying a security patch that addresses and remedies the cyberattack over the current cyberattack detection technology.

In some embodiments, the disclosed system may implement a deep learning algorithm to analyze cyberattacks, execute simulations of addressing a cyberattack by implementing different security protocols (or implementations) across multiple computing test devices, determine an outcome of each simulation, and provide an updated security protocol that addresses and remedies the cyberattack. In this manner, the disclosed system provides an additional practical application and technical improvement of determining a particular security patch that addresses and remedies each cyberattack over the current cyberattack mitigation technology.

In some embodiments, in response to detecting a cyberattack, the disclosed system may initiate scanning for the particular set of physical and digital impressions associated with the cyberattack across multiple computing devices. This provides a technical improvement of proactively searching for evidence of the cyberattack across multiple computing devices over the current cyberattack detection techniques. In response to detecting similar evidence (e.g., effects of the cyberattack) on a computing device, the disclosed system may deploy and install a particular security patch that is determined to address and remedy the cyberattack on the computing device.

In some embodiments, in response to detecting a cyberattack, the disclosed system may communicate an alert to a user, where the alert indicates that the cyberattack is detected. The alert may include the security patch and/or instructions to deploy and install the security patch.

In some embodiments, in response to detecting a cyberattack, the disclosed system may associate the network traffic associated with the cyberattack with a particular alert sign or icon. Therefore, if corresponding network traffic is detected in any computing device, a particular alert sign may be displayed. For example, assuming that the cyberattack is associated with a spam email, the disclosed system may associate the spam email with an alert sign or icon. Therefore, if the spam email is inbound to any computing device, the alert sign or icon may be displayed along with the spam email. This helps to make the users aware not to open or otherwise access spam emails.

In some embodiments, the disclosed system may block the cyberattack. For example, in response to detecting a cyberattack on a first computing device associated with an organization, the disclosed system may implement a firewall protocol/policy to block network traffic associated with the cyberattack across all computing devices associated with the organization. Accordingly, the disclosed system provides an additional practical application and technical improvement of implementing a firewall protocol/policy that blocks the cyberattack.

In some embodiments, the disclosed system may generate a unique identifier for the cyberattack based on the physical and digital impressions of the cyberattack on a user device. For example, the unique identifier may be a virtual image, and the disclosed system may generate the virtual image by encoding anomalies caused by the cyberattack using a machine learning algorithm. The disclosed system (e.g., via the machine learning algorithm) may use the virtual image to learn the patterns between the anomalies and the relationship between the cyberattack and the anomalies. The disclosed system may use this information to further increase its accuracy in detecting cyberattacks with similar patterns. This, in turn, leads to detecting whether a cyberattack is part of a campaign or an isolated incident. In response, the disclosed system may determine and perform appropriate mitigation plans to address each of the attack campaigns and isolated incidents. Accordingly, the disclosed system provides an additional practical application and technical improvements for identifying attack campaigns and isolated attacks and preform appropriate mitigation plans.

In some embodiments, the disclosed system may generate a virtual representation of a scenario where a cyberattack was launched in a virtual environment. For example, the disclosed system may generate an interactive virtual image/video of a scenario where a cyberattack was launched. Users may interact with the virtual image/video by proposing different security measures/protocols. The disclosed system may display an outcome of each different proposed security measure/protocol on the virtual representation of the attack scenario and display what happens if each proposed security measure/protocol is implemented. For example, if a proposed security protocol is to block port A of a computing device where the cyberattack is detected, the disclosed system may show the virtual representation of the network infrastructure along with the computing device and the entire life cycle from where the cyberattack was launched, what happens if the port A is blocked, suggest a security protocol to address and remedy the cyberattack. The users can view, update, override, or confirm the suggested security protocol on the virtual representation.

Security Patch Deployment in Response to Detecting Malicious Network Traffic

In some embodiments, a system for detecting and addressing security threats comprises a memory operably coupled with a processor. The memory is configured to store a plurality of anomaly data comprising first anomaly data associated with first malicious network traffic. The first anomaly data is further associated with a first security patch. The first anomaly data indicates a first set of anomalies caused by the first malicious network traffic. The processor is configured to detect incoming network traffic to a computing device. The processor is further configured to detect at least one of the physical or digital effects of the incoming network traffic on the computing device. The processor is further configured to determine that the incoming network traffic is causing a second set of anomalies based at least in part upon the at least one of detected physical or digital effects. The processor is further configured to compare each of the second set of anomalies with a counterpart anomaly from among the first set of anomalies. The processor is further configured to determine that more than a threshold percentage of anomalies from among the second set of anomalies correspond to counterpart anomalies from among the first set of anomalies. In response to determining that more than the threshold percentage of anomalies from among the second set of anomalies correspond to the counterpart anomalies from among the first set of anomalies, the processor is further configured to communicate the first security patch to the computing device and communicate an instruction that causes the first security patch to be executed on the computing device.

Determining a Security Patch for a Cyberattack by Executing Simulations of Different Security Protocols In some embodiments, a system for determining a security patch for malicious network traffic comprises a memory coupled to a processor. The memory is configured to store information associated with first malicious network traffic. The processor is configured to communicate the first malicious network traffic to a first testing computing device. The processor is further configured to trigger execution of a first security protocol on the first testing computing device, wherein the first security protocol is configured to implement a first software instruction to address an effect of the first malicious network traffic on the first testing computing device. The processor is further configured to communicate the first malicious network traffic to a second testing computing device. The processor is further configured to trigger execution of a second security protocol on the second testing computing device, wherein the second security protocol is configured to implement a second software instruction to address the effect of the first malicious network traffic on the second testing computing device. The processor is further configured to determine that the first software instruction is configured to counter the effect of the first malicious network traffic by removing a security vulnerability in a piece of code associated with an operating system of the first testing computing device. The processor is further configured to determine that the second software instruction is associated with an anomaly. In response to determining that the first software instruction is configured to counter the effect of the first malicious network traffic and that the second software instruction is associated with the anomaly, the processor is further configured to communicate the first security protocol to one or more user devices and communicate an instruction that causes the first security protocol to be executed on the one or more user devices.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect malicious network traffic and deploy a security patch that is determined to address and remedy the malicious network traffic; and to determine a security patch for a cyberattack by executing simulations of different security protocols on test machines. Embodiments of the present disclosure and its advantages may be understood by referring to FIGS. 1 through 5. FIGS. 1 through 5 are used to describe systems and methods to detect malicious network traffic and deploy a security patch that is determined to address and remedy the malicious network traffic; and to determine a security patch for a cyberattack by executing simulations of different security protocols on test machines, according to some embodiments.

System Overview

Figure 1:
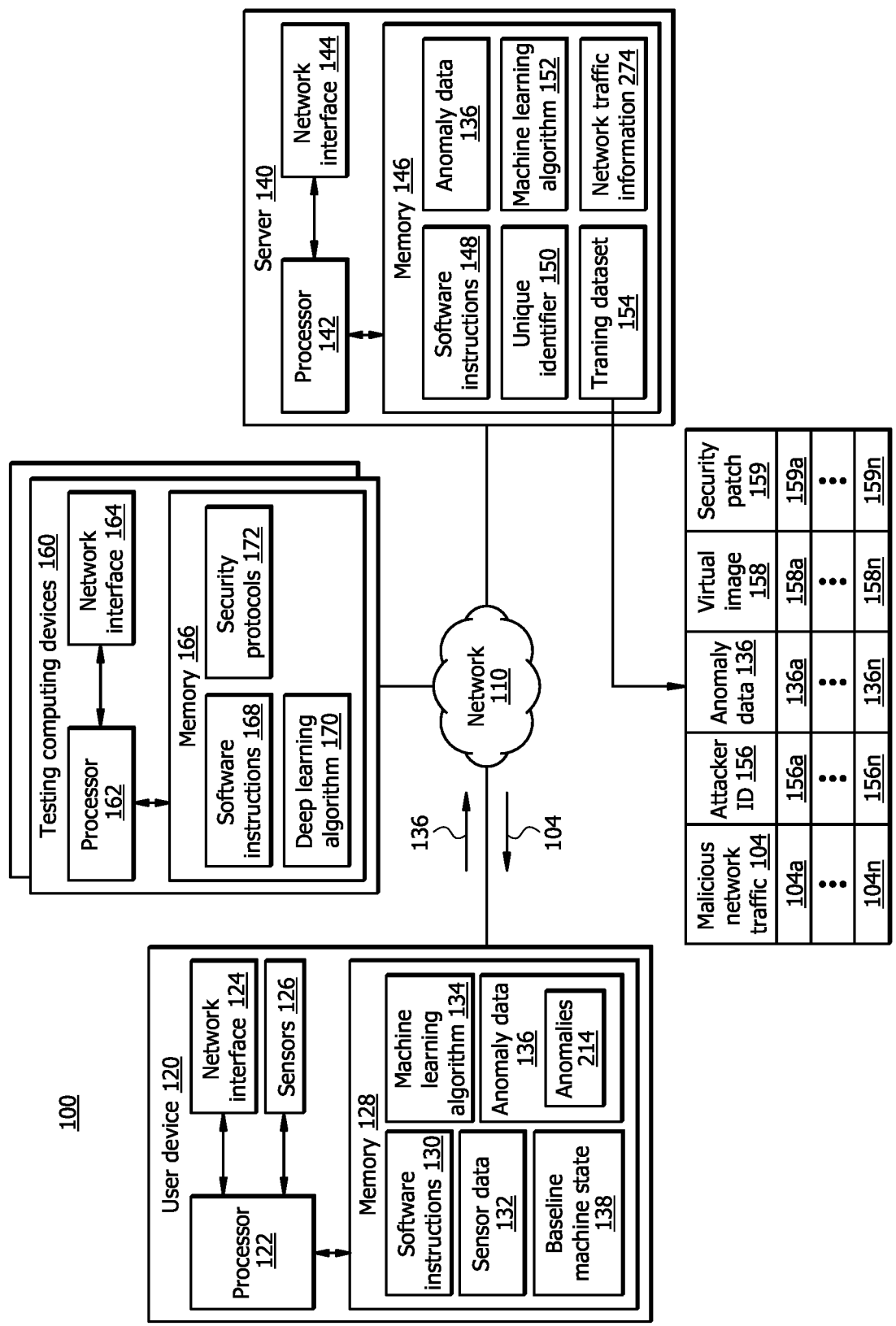
FIG. 1 illustrates an embodiment of a system configured to detect malicious network traffic and deploy a security patch that is determined to address and remedy the malicious network traffic.

FIG. 1 illustrates an embodiment of a system 100 that is generally configured to detect malicious network traffic and deploy security patches that are determined to address and remedy the malicious network traffic. The malicious network traffic is interchangeably referred to herein as cyberattacks or malware. In some embodiments, the system 100 comprises one or more user devices 120, a server 140, one or more testing computing devices 160 operably coupled to one another via a network 110. Network 110 enables communications among the components of the system 100. The user device 120 comprises a processor 122 in signal communication with a memory 128. Memory 128 stores software instructions 130 that when executed by the processor 122 cause the processor 122 to perform one or more operations of the user devices 120 described herein. The server 140 comprises a processor 142 in signal communication with a memory 146. Memory 146 stores software instructions 148 that when executed by the processor 142 cause the processor 142 to perform one or more operations of the server 140 described herein. Each testing computing device 160 comprises a processor 162 in signal communication with a memory 166. Memory 166 stores software instructions 168 that when executed by the processor 162 cause the processor 162 to perform one or more operations of the testing computing device 160 described herein. In other embodiments, system 100 may not have all of the components listed and/or may have other elements instead of, or in addition to, those listed above.

In general, the system 100 improves the security of user devices 120. In an example scenario, assume that a cyberattack A was launched and targeted a user device 120. Cyberattack A leaves a particular set of physical and digital impressions/footprints on the user device 120. For example, cyberattack A may increase the internal thermal reading of the user device 120 by a certain amount (e.g., by 2.9 degrees, 3.3 degrees, etc.), increase the fan speed by a certain amount (e.g., by 50 rounds per minute (RPM), 60 RPM, etc.), increase the electricity consumption by a certain percentage (e.g., by 20%, 30%, etc.), increase memory utilization by a certain percentage (e.g., by 20%, 30, etc.), increase hard disk engagement by a certain amount (e.g., by 20%, 30%, etc.), cause abnormal timestamps or event be recorded, among physical and digital impressions/footprint.

The current malware and cyberattack detection techniques are not configured to use the physical and digital impressions of a cyberattack to identify and classify the cyberattack, and determine an appropriate security patch that addresses or remedies the cyberattack. Furthermore, the current malware and cyberattack detection techniques are retroactive-meaning that after the attack has done its intended damage to user devices, the cyberattack can be detected and addressed. The current malware and cyberattack detection techniques suffer from several drawbacks. For example, because the current malware and cyberattack detection techniques are retroactive, the security of user devices and information stored in the user devices is already compromised by the cyberattack.

The present disclosure contemplates unconventional systems and methods to detect the physical and digital impressions of cyberattacks on user devices, create a training dataset that comprises the detected physical and digital impressions of the cyberattacks, train a machine learning algorithm using the training dataset to identify a cyberattack based on respective physical and digital impressions on a user device by cross-referencing the detected physical and digital impressions with each entry in the training dataset, identify a security patch associated with a previously-classified and identified cyberattack from the training dataset, and deploy and install the security patch on the user device. In this manner, the system 100 is configured to learn from the training dataset and cyberattacks (using supervised, unsupervised, and/or semi-supervised learning) and proactively detect cyberattacks before a cyberattack has a change to infect a user device, access information stored at the user device, or misuse the information stored at the user device. The system 100 may then recommend, deploy, install, and/or execute a security patch that is determined to address and remedy the cyberattack. Accordingly, the system 100 provides a practical application and technical improvement of proactively detecting a cyberattack and deploying a security patch that addresses and remedies the cyberattack over the current cyberattack detection technology.

In some embodiments, the system 100 may implement a deep learning algorithm to analyze cyberattacks, execute simulations of addressing a cyberattack by implementing different security protocols (or implementations) across multiple computing test devices, determine an outcome of each simulation, and provide an updated security protocol that addresses and remedies the cyberattack. In this manner, the system 100 provides an additional practical application and technical improvement of determining a particular security patch that addresses and remedies each cyberattack over the current cyberattack mitigation technology.

In some embodiments, in response to detecting a cyberattack, the system 100 may initiate scanning for the particular set of physical and digital impressions associated with the cyberattack across multiple computing devices. This provides a technical improvement of proactively searching for evidence of the cyberattack across multiple computing devices over the current cyberattack detection techniques. In response to detecting a similar evidence (e.g., effects of the cyberattack) on a computing device, the system 100 may deploy and install a particular security patch that is determined to address and remedy the cyberattack on the computing device.

In some embodiments, in response to detecting a cyberattack, the system 100 may communicate an alert to a user, where the alert indicates that the cyberattack is detected. The alert may include the security patch and/or instructions to deploy and install the security patch.

In some embodiments, in response to detecting a cyberattack, the system 100 may associate the network traffic associated with the cyberattack with a particular alert sign or icon. Therefore, if corresponding network traffic is detected in any computing device, the particular alert sign may be displayed. For example, assuming that the cyberattack is associated with a spam email, the system 100 may associate the spam email with an alert sign or icon. Therefore, if the spam email is inbound to any computing device, the alert sign or icon may be displayed along with the spam email. This helps to make the users aware not to open or otherwise access spam emails.

In some embodiments, the system 100 may block the cyberattack. For example, in response to detecting a cyberattack on a first computing device associated with an organization, the system 100 may implement a firewall protocol/policy to block network traffic associated with the cyberattack across all computing devices associated with the organization. Accordingly, the system 100 provides an additional practical application and technical improvement of implementing a firewall protocol/policy that blocks the cyberattack.

In some embodiments, the system 100 may generate a unique identifier for the cyberattack based on the physical and digital impressions of the cyberattack on a user device. For example, the unique identifier may be a virtual image, and the system 100 may generate the virtual image by encoding anomalies caused by the cyberattack using a machine learning algorithm. The system 100 (e.g., via the machine learning algorithm) may use the virtual image to learn the patterns between the anomalies and relationship between the cyberattack and the anomalies. The system 100 may use this information to further increase its accuracy in detecting cyberattacks with similar patterns. This, in turn, leads to detecting whether a cyberattack is part of a campaign or an isolated incident. In response, the system 100 may determine and perform appropriate mitigation plans to address each of the attack campaigns and isolated incidents. Accordingly, the system 100 provides an additional practical application and technical improvements for identifying attack campaigns and isolated attacks, and preform appropriate mitigation plans.

In some embodiments, the system 100 may generate a virtual representation of a scenario where a cyberattack was launched in a virtual environment. For example, the system 100 may generate an interactive virtual image/video of a scenario where a cyberattack was launched. Users may interact with the virtual image/video by proposing different security measures/protocols. The system 100 may display an outcome of each different proposed security measure/protocol on the virtual representation of the attack scenario and display what happens if each proposed security measure/protocol is implemented. For example, if a proposed security protocol is to block port A of a computing device where the cyberattack is detected, the system 100 may show the virtual representation of the network infrastructure along with the computing device and the entire life cycle from where the cyberattack was launched, what happens if the port A is blocked, suggest a security protocol to address and remedy the cyberattack. The users can view, update, override, or confirm the suggested security protocol on the virtual representation.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

User Device

A user device 120 is generally any device that is configured to process data and interact with users. Examples of the user device 120 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The user device 120 may include a user interface, such as a display, a microphone, a camera, a keypad, or other appropriate terminal equipment usable by users. The user device 120 may include a hardware processor 122 operably coupled with a network interface, sensors 126, and memory 128, configured to perform any of the functions or actions of the user device 120 described herein. The user device 120 is configured to communicate with other devices and components of the system 100 via the network 110. For example, the user device 120 may communicate anomaly data 136 to the server 140 via the network 110. The user device 120 may interchangeably be referred to herein as a computing device.

Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 130) to perform the operations of the server 140 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-5. For example, the processor 122 may be configured to perform one or more operations of the operational flow 200 as described in FIG. 2, one or more operations of the method 300 as described in FIG. 3, one or more operations of the operational flow 400 as described in FIG. 4, one or more operations of the method 500 as described in FIG. 5.

Network interface 124 is configured to enable wired and/or wireless communications. The network interface 124 may be configured to communicate data between the server 140 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

Sensors 126 may include any type of sensor, including thermal sensors, fan speed sensors, electricity consumption sensors, electromagnetic sensors, memory utilization sensors, processing unit (e.g., CPU) utilization sensors, hard disk engagement/utilization sensors, among other sensors. The sensors 125 may capture sensor data 132. The sensor data 132 may include thermal reading of one or more internal component of the user device 120, thermal reading of the interior of the user device 120, electromagnetic field measurement detected within a detection range of the electromagnetic sensor, fan speed data, memory utilization data, processing unit utilization data, hard disk utilization data, electricity consumption data, among others. The sensors 126 communicate the sensor data 132 to the processor 122 for processing.

Memory 128 may be volatile or non-volatile and may comprise read-only memory (ROM), random-access memory (RAM), ternary content-addressable memory (TCAM), dynamic random-access memory (DRAM), and static random-access memory (SRAM). The memory 128 may include one or more of a local database, a cloud database, a network-attached storage (NAS), etc. The memory 128 comprises one or more disks, tape drives, or solid-state drives, and may be used as an over-flow data storage device, to store programs when such programs are selected for execution, and to store instructions and data that are read during program execution. The memory 128 may store any of the information described in FIGS. 1-5 along with any other data, instructions, logic, rules, or code operable to implement the function(s) described herein when executed by processor 122. For example, the memory 128 may store software instructions 130, sensor data 132, machine learning algorithm 134, anomaly data 136, baseline machine state 138, and/or any other data or instructions. The software instructions 130 may comprise any suitable set of instructions, logic, rules, or code operable to execute the processor 122 and perform the functions described herein, such as some or all of those described in FIGS. 1-5.

Machine learning algorithm 134 may be implemented by the processor 122 executing software instructions 130 and is generally configured to process the sensor data 132 and detect physical and digital impressions of a cyberattack on the user device 120. In some embodiments, the machine learning algorithm 134 may include a support vector machine, neural network, random forest, k-means clustering. Tree-based algorithm, Random Forest algorithm, etc. In some embodiments, the machine learning algorithm 134 may include data processing machine learning algorithm that is configured to analyze the sensor data 132. The machine learning algorithm 134 may be implemented by supervised, semi-supervised, and/or unsupervised machine learning. The machine learning algorithm 134 may receive the sensor data 132 (from the sensors 126 and/or the processor 122) and may determine whether there is any deviation from baseline machine state 138. If a deviation from the baseline machine state 138 is detected, the machine learning algorithm 134 may detect that the deviation may be caused by malicious network traffic 104. In response, the machine learning algorithm 134 may detect the physical and digital impressions of malicious network traffic 104 on the user device 120.

Anomaly data 136 may indicate a set of anomalies 214 caused by the malicious network traffic 104. The set of anomalies 214 may include, but is not limited to, increase in thermal reading of the user device 120 by a certain amount (e.g., by 2.9 degrees, 3.3 degrees, etc.), increase in electromagnetic field within a detection range of electromagnetic sensor of the user device 120 by a certain amount (e.g., by 10%, 20%, etc.), for example, due to external and/or internal induced electromagnetic field), increase in the fan speed by a certain amount (e.g., by 50 rounds per minute (RPM), 60 RPM, etc.), increase in the electricity consumption by a certain percentage (e.g., by 20%, 30%, etc.), increase in memory utilization by a certain percentage (e.g., by 20%, 30, etc.), increase in central processing unit (e.g., processor 122) utilization by a certain amount (e.g., by 20%, 30%, etc.), increase in hard disk usage/engagement by a certain amount (e.g., by 20%, 30%, etc.), records of abnormal timestamps of events or processing instructions, among others. The set of anomalies may also be referred to as the physical and digital impressions.

Baseline machine state 138 may indicate baseline (e.g., usual/average) physical and digital attributes of the user device 120 under conditions when no malicious network traffic 104 is inbound or otherwise present at the user device 120. For example, under observation where no malicious network traffic 104 is inbound or otherwise present at the user device 120, the baseline machine state 138 may be determined. The baseline machine state 138 may include the thermal reading of one or more internal components of the user device 120, the thermal reading of the interior of the user device 120, the fan speed, the electromagnetic field within a particular range of the user device 120, the electricity consumption, memory utilization, hard disk utilization, processing unit utilization, timestamps of processing instructions, among others.

The user device 120 is configured to detect physical and digital impressions or effects that a malicious network traffic 104 has the user device 120, uses the physical and digital impressions of the cyberattack 104 to generate a unique identifier 150 for the malicious network traffic 104. The user device 120 may generate the unique identifier 150 that identifies the anomaly data 136 and malicious network traffic 104. In some embodiments, the user device 120 may generate the unique identifier 150 using the machine learning algorithm. For example, the unique identifier 150 may be generated by encoding the anomaly data 136 representing the set of anomalies into a virtual image 158.

In some embodiments, the user device 120 may generate the unique identifier using a hash function, an encryption function, and the like. In one example, the unique identifier 150 may be a virtual image 158 that represents the anomaly data 136 associated with the malicious network traffic 104. In one example, the unique identifier 150 may be a quick response (QR) code, a bar code, or any encoded visual representation. The user device 120 may store the unique identifier 150 and use it to train the machine learning algorithm 134 to detect future malicious network traffic by using the unique identifier 150 as a part of the training dataset 154.

In some embodiments, the user device 120 may communicate the anomaly data 136 to the server 140 and the server 140 may generate the unique identifier 150 based on the anomaly data 136, similar to that described above. In response, the server 140 may store the unique identifier 150 and use it to train the machine learning algorithm 152 to detect future malicious network traffic by using the unique identifier 150 as a part of the training dataset 154.

Server

Server 140 generally includes a hardware computer system generally configured to proactively and retroactively detect malicious network traffic, and identify a security patch that addresses and remedies the malicious network traffic. In some embodiments, the server 140 may be implemented by a cluster of computing devices, such as virtual machines. For example, the server 140 may be implemented by a plurality of computing devices using distributed computing and/or cloud computing systems in a network. In some embodiments, the server 140 may be configured to provide services and resources (e.g., data and/or hardware resources, such as security patches 159) to other components and devices.

The server 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of the operational flow 200 as described in FIG. 2, one or more operations of the method 300 as described in FIG. 3, one or more operations of the operational flow 400 as described in FIG. 4, one or more operations of the method 500 as described in FIG. 5.

Network interface 144 is configured to enable wired and/or wireless communications. The network interface 144 may be configured to communicate data between the server 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, a cloud database, a network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, unique identifiers 150, machine learning algorithm 152, training dataset 154, anomaly data 136, network traffic information 174, and/or any other data or instructions. The software instructions 148 may comprise any suitable set of instructions, logic, rules, or code operable to execute the processor 142 and perform the functions described herein, such as some or all of those described in FIGS. 1-5.

Machine learning algorithm 152 may be implemented by the processor 142 executing software instructions 148 and is generally configured to analyze anomaly data 136, and detect a security patch that addresses and remedies a malicious network traffic 104. In some embodiments, the machine learning algorithm 152 may include a support vector machine, neural network, random forest, k-means clustering. Tree-based algorithm, Random Forest algorithm, etc. In some embodiments, the machine learning algorithm 152 may include data processing machine learning algorithm that is configured to analyze the anomaly data 136. The machine learning algorithm 152 may be implemented by supervised, semi-supervised, and/or unsupervised machine learning. For example, in a training stage, the machine learning algorithm 152 is given at least a part of the training dataset 154 and is asked to learn the relationship between each malicious network traffic 104 and respective attacker identification (ID) 156, anomaly data 136, virtual image 158 (e.g., unique identifier), and security patch 159, and predict corresponding anomaly data 136, security patch 159, among other information for a given anomaly data 136 and/or malicious network traffic 104.

The training dataset 154 may include a set of anomaly data 136, each labeled with a respective malicious network traffic 104, attacker ID 156, virtual image 158, and security patch 159. The attacker ID 156 may be assigned to the malicious network traffic 104 by the server 140 and/or a user. The attacker ID 156 may be a serial number, a name associated with the bad actor causing or contributing to the malicious network traffic 104, and the like. In one example, the machine learning algorithm 152 feeds the anomaly data 136*a* to a neural network to extract a first set of features from the anomaly data 136*a*. The first set of features may indicate patterns, and physical and digital impressions of the respective malicious network traffic 104*a*. The first set of features may be represented by a first vector comprising numerical values. The machine learning algorithm 152 may learn to associate the first set of features with the respective anomaly data 136*a*, malicious network traffic 104*a*, attacker ID 156*a*, virtual image 158*a*, and security patch 159*a*. The machine learning algorithm 152 may determine (or update) weight and bias values of the neural network in multiple epochs to increase the prediction of the respective anomaly data 136*a*, malicious network traffic 104*a*, attacker ID 156*a*, virtual image 158*a*, and security patch 159*a* for a given anomaly data 136*a*. The machine learning algorithm 152 may perform a similar operation for each entry of the training dataset 154, e.g., each malicious network traffic 104*a-n*, attacker ID 156*a-n*, anomaly data 136*a-n*, virtual image 158*a-n*, and security patch 159*a-n*.

In a testing stage, the machine learning algorithm 152 may be given an anomaly data 136*n* that is not labeled and is asked to predict one or more of the malicious network traffic 104, attacker ID 156, virtual image 158, and security patch 159 for the given anomaly data 136*n*. The machine learning algorithm 152 may feed the anomaly data 136*n* to the neural network to extract a second set of features from the anomaly data 136*n*. The second set of features may represent the pattern, and physical and digital impressions associated with anomaly data 136*n*. The second set of features may be represented by a second vector comprising numerical values. The machine learning algorithm 152 may compare the first vector with the second vector. The machine learning algorithm 152 may determine an Euclidean distance between the first and second vectors. If it is determined that the Euclidean distance is less than a threshold distance (e.g., less than 0.1, 0.2, etc.), the machine learning algorithm 152 may predict that the anomaly data 136*n* is associated with the malicious network traffic 104*n*, attacker ID 156*n*, virtual image 158*n*, and security patch 159*n*.

Testing Computing Devices

Each testing computing device 160 generally includes a hardware computer system generally configured to analyze malicious network traffic 104, execute simulations of scenarios of different malicious network traffic 104 and for each malicious network traffic 104, determine possible outcomes when different security protocols are implemented across multiple testing devices 160, and provide updated security protocols 172 that addresses and remedies each malicious network traffic 104. In some embodiments, testing computing devices 160 may be implemented by a cluster of computing devices, such as virtual machines. For example, the testing computing devices 160 may be implemented by a plurality of computing devices using distributed computing and/or cloud computing systems in a network. In some embodiments, the testing computing devices 160 may be configured to provide services and resources (e.g., data and/or hardware resources, such as updated security protocols 172) to other components and devices.

Each testing computing device 160 comprises a processor 162 operably coupled with a network interface 164 and a memory 166. Processor 162 comprises one or more processors. The processor 162 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the server 140 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-5. For example, the processor 162 may be configured to perform one or more operations of the operational flow 200 as described in FIG. 2 and one or more operations of the method 300 as described in FIG. 3.

Network interface 164 is configured to enable wired and/or wireless communications. The network interface 164 may be configured to communicate data between the server 140 and other devices, systems, or domains. For example, the network interface 164 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 162 may be configured to send and receive data using the network interface 164. The network interface 164 may be configured to use any suitable type of communication protocol.

The memory 166 may be volatile or non-volatile and may comprise read-only memory (ROM), random-access memory (RAM), ternary content-addressable memory (TCAM), dynamic random-access memory (DRAM), and static random-access memory (SRAM). The memory 166 may include one or more of a local database, a cloud database, a network-attached storage (NAS), etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-5 along with any other data, instructions, logic, rules, or code operable to implement the function(s) described herein when executed by processor 162. For example, the memory 166 may store software instructions 168, deep learning algorithm 170, and security protocols 172, and/or any other data or instructions. The software instructions 168 may comprise any suitable set of instructions, logic, rules, or code operable to execute the processor 162 and perform the functions described herein, such as some or all of those described in FIGS. 1-5.

Deep learning algorithm 170 may be implemented by the processor 162 executing software instructions 168 and is generally configured to analyze malicious network traffic 104, execute a plurality of simulations with different security protocols 172 across multiple devices 160, and provide an updated security protocol 172 that addresses and remedies the malicious network traffic 104 in questions. In some embodiments, the updated security protocol 172 may include an updated firewall policy to block the malicious network traffic 104, security patch 159, and the like. In some embodiments, the deep learning algorithm 170 may include a support vector machine, neural network, random forest, k-means clustering. Tree-based algorithm, Random Forest algorithm, etc. In some embodiments, the deep learning algorithm 170 may include data processing machine learning algorithm that is configured to analyze the malicious network traffic 104. The deep learning algorithm 170 may be implemented by supervised, semi-supervised, and/or unsupervised learning. The testing computing devices 160 may implement the deep learning algorithm 170 to perform one or more of its operations described herein.

Figure 2:
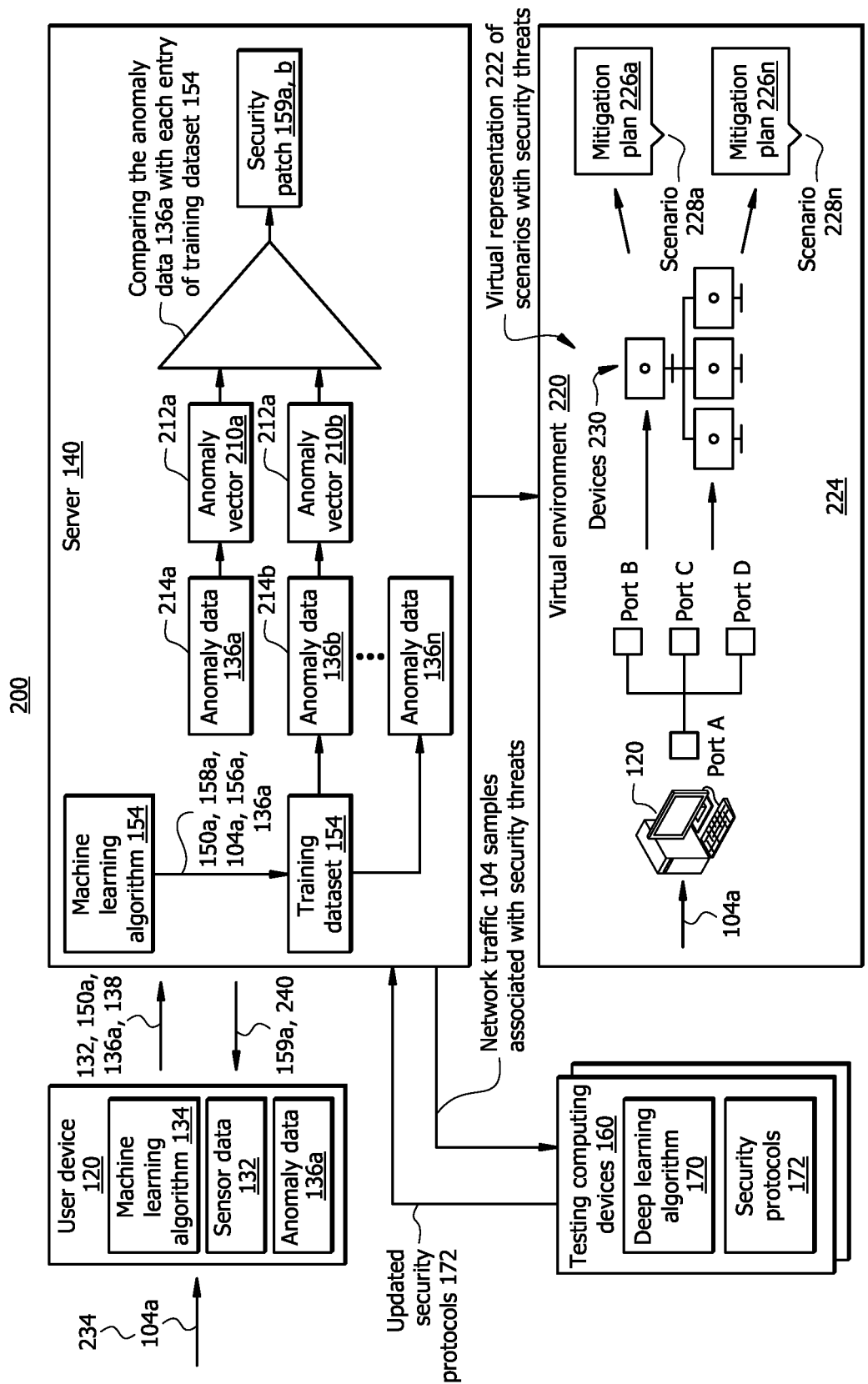
FIG. 2 illustrates an example operational flow of the system of FIG. 1 for detecting malicious network traffic and deploying a security patch that is determined to address and remedy the malicious network traffic.

Operational Flow for Detecting Malicious Network Traffic and Deploying a Security Patch that is Determined to Address and Remedy the Malicious Network Traffic FIG. 2 illustrates an example operational flow 200 of system 100 (see FIG. 1) for detecting that network traffic 104 is malicious and in response, deploying and installing a security patch 159 that is determined to address and remedy the malicious network traffic 104. In operation, the operational flow 200 begins when the incoming network traffic 104 is inbound to the user device 120. For example, the network traffic 104 may be associated with spam, phishing message (e.g., email, text, data), popup message, or any other kind of network traffic.

The sensors of the user device 120 may capture the sensor data 132, similar to that described in FIG. 1. The sensor data 132 may indicate physical and digital attributes of the computing device 120, e.g., thermal reading, fan speed, electricity consumption amount, memory utilization percentage, hard disk usage, and central processing unit (CPU) utilization percentage, timestamps of processing instructions, etc. The user device 120 may analyze the sensor data 132. In some embodiments, the user device 120 may feed the sensor data 132 to the machine learning algorithm 134 for processing.

Detecting Whether Incoming Network Traffic is Malicious

The user device 120 (e.g., via machine learning algorithm 134) may detect physical and digital impressions/effects of the network traffic 104a on the user device 120 based on the sensor data 132. In some embodiments, a timestamp of the arrival of the network traffic 104a may be used to associate the sensor data 132 with the user device 120. In this manner, the network traffic 104a may be singled out from among a plurality of network traffic inbound to the user device 102 as associating with the sensor data 132, anomaly data 136a, and physical and digital impressions. The user device 120 may determine that the network traffic 104a is causing a set of anomalies based on the detected physical and digital impressions of the network traffic 104a on the user device 120 and the sensor data 132. In this process, in some embodiments, the user device 120 may compare the physical and digital impressions of the network traffic 104a with the baseline machine state 138. The user device 120 may determine whether the physical and digital impressions of the network traffic 104a cause a deviation from the baseline machine state 138. For example, the deviation from the baseline machine state 138 maybe 1%, 5%, 10%, etc. for each physical and/or digital attribute of the user device 120 as indicated in the sensor data 132. In other words, the user device 120 may determine whether the sensor data 132 indicates a deviation between the physical and digital attributes of the user device 120 from the baseline machine state 138. i.e., whether the physical and digital attributes of the user device 120 deviate from the baseline machine state 138. If it is determined that the sensor data 132 indicates a deviation between the physical and digital attributes of the user device 120 from the baseline machine state 138, the user device 120 may determine that the network traffic 104a is causing the anomalies indicated in the anomaly data 136. In response, the user device 120 may determine that the network traffic 104a is causing a set of anomalies 214a (indicated in the anomaly data 136a) based on the detected physical and digital impressions indicated in the sensor data 132 and that the network traffic 104 is malicious.

In some embodiments, similar operations related to analyzing the anomaly data 136a and sensor data 132 may be performed by the server 140. For example, the user device 120 may communicate the sensor data 132 to the server 140, and the server 140 may analyze the sensor data 132, detect the incoming network traffic 104a, detect the physical and digital impressions of the network traffic 104a on the user device 120, and determine that the network traffic 104a is causing anomalies 214a based on the sensor data 132 and detected physical and digital impressions of the network traffic 104a, e.g., via the machine learning algorithm 152.

In some embodiments, the user device 120 may generate a unique identifier 150 that identifies the network traffic 104a, for example, by implementing machine learning algorithm 134, hash function, encryption function, and the like, similar to that described in FIG. 1. The user device 120 may communicate the sensor data 132, anomaly data 136a, the unique identifier 150a, or any other data to the server 140.

In some embodiments, the server 140 may generate the unique identifier 150a by encoding the anomaly data 136a into a virtual image 158a. For example, the server 140 may feed the anomaly data 136a to the machine learning algorithm 152 to generate the unique identifier 150a. In other examples, the server 140 may generate the unique identifier 150a by implementing a hash function, an encryption function, and the like. The server 140 may populate the training dataset 154 with a new entry (row) for the network traffic 104a. The server 140 may store the unique identifier 150a in a respective entry of the network traffic 104a in the training dataset 154. The server 140 may also determine the attacker ID 156a, virtual image 158a. For example, the server 140 may determine the attacker ID 156a based on input from a user and/or from the user device 120, and determine the virtual image 158a by encoding the anomaly data 136a into a visual representation. These operations are described further below in greater detail. The server 140 may store the attacker ID 156a and virtual image 158a in the respective entry of the network traffic 104. The server 140 may also determine the security patch 159a as described below and store the security patch 159a in the respective row of the network traffic 104a in the training dataset 154. The server 140 may train the machine learning algorithm 152 using the training dataset 154 for predicting malicious network traffic 104a, security patches 159a, etc., similar to that described in FIG. 1.

Identifying a Security Patch for the Network Traffic

The server 140 may identify a security patch 159a that addresses and remedies the network traffic 104a. In this process, the server 140 may use the machine learning algorithm 152 and training dataset 154. For example, assume that the network traffic 104a and other information associated with the network traffic 104a where previously not added to the training dataset 154. To analyze the network traffic 104a, the server 140 may feed the anomaly data 136a to the machine learning algorithm 152 to extract a first set of features 212a from the anomaly data 136a. The first set of features 212a may be represented by an anomaly vector 210a that comprises numerical values. The first set of features 212a may indicate the physical and digital impressions of the network traffic 104a, including, but not limited to, an increase in thermal reading of the user device 120 by a certain amount (e.g., by 2.9 degrees, 3.3 degrees, etc.), increase in the fan speed by a certain amount (e.g., by 50 RPM, 60 RPM, etc.), increase in the electricity consumption by a certain percentage (e.g., by 20%, 30%, etc.), increase in memory utilization by a certain percentage (e.g., by 20%, 30, etc.), increase in hard disk engagement/utilization by a certain amount (e.g., by 20%, 30%, etc.), abnormal timestamps of events or processing instructions, among others. The server 140 may perform a similar operation for each entry of the training dataset 154. For example, with respect to the anomaly data 136b, the server 140 may feed the anomaly data 136b (from the training dataset 154) to the machine learning algorithm 152 to extract a second set of features 212b form the anomaly data 136b. The second set of features 212b may be represented by an anomaly vector 210b that comprises numerical values. The second set of features 212b may include physical and digital impressions of the network traffic 104b, including thermal reading deviation data, fan speed deviation data, electricity consumption deviation data, memory utilization deviation data, hard disk utilization deviation data, processor utilization deviation data, timestamp deviation data, among others.

The server 140 may compare each of the first set of anomalies 214a (indicated in the anomaly data 136a) with a counterpart anomaly from among the second set of anomalies 214b (indicated in the anomaly data 136b). In this process, the server 140 may compare each of the features 212a with a counterpart feature from among the features 212b. In other words, the server 140 determines a similarity score between the anomaly vectors 210a and 210b. In some embodiments, the server 140 determines whether more than a threshold percentage of the anomalies 214a corresponds to the counterpart anomalies 214b. The threshold percentage may be 70%, 80%, 90%, etc. If more than the threshold percentage of the anomalies 214a correspond to the counterpart anomalies 214b, it may be determined that the network traffic 104a corresponds to the network traffic 104b. In response, it may be determined that the physical and digital impressions of the network traffic 104a may be similar to the physical and digital impressions of the network traffic 104b. In response, the server 140 may determine that the security patch 159b associated with the network traffic 104b may be used to address and remedy the malicious network traffic 104a. The server 140 may add the security patch 159a (that corresponds to the security patch 159b in this example) to the row of the network traffic 104a in the training dataset 154.

The server 140 may communicate the security patch 159a to the user device 120. In some embodiments, the server 140 may cause execution, deployment, and installation of the security patch 159a on the user device 120. In some embodiments, the server 140 may communicate instructions 240 that cause the security patch 159a to be executed on the user device 120 to the user device 120. In some embodiments, the instructions 240 may indicate to execute the security patch 159a. In some embodiments, the user device 120 may execute the security patch 159a on itself.

In some embodiments, the server 140 and/or the user device 120 may implement a firewall protocol/policy to block the network traffic 104a across multiple user devices 120 associated with an organization. In some embodiments, the server 140 and/or the user device 120 may communicate an alert or notification message that indicates that network traffic 104 is detected. For example, the alert or notification message may be sent to users and/or administrators.

In some embodiments, the server 140 and/or user device 120 may associate the network traffic 104a with an alert message/notification. In response, if a future network traffic 104a is inbound, it may be displayed with the alert message which alerts users to not access the network traffic 104a. For example, assuming that the network traffic 104a is a spam email, the spam email may be associated with a warning sign/icon. In response, when the spam email is seen in an email inbox, it may be shown with a warning sign/icon. Thus, users may become aware that this is a spam email.

Determining an Updated Security Protocol Based on Simulations Across Multiple Machines The server 140 may communicate network traffic 104 samples associated with security threats to the testing computing devices 160. The testing computing devices 160 may feed the network traffic 104 samples to the deep learning algorithm 170 to analyze the network traffic 104 samples. The testing computing devices 160 may execute simulations of scenarios of different malicious network traffic 104 and for each malicious network traffic 104, determine possible outcomes when different security protocols 172 are implemented across multiple testing devices 160, and provide updated security protocols 172 that address and remedy each malicious network traffic 104. For example, a first malicious network traffic 104a may be introduced to a first testing computing device 160. The first testing computing device 160 may simulate a scenario where a first security protocol 172 is implemented to address the first malicious network traffic 104a. The first testing computing device 160 may determine the outcome of what would happen if the first security protocol 172 is used to address the first malicious network traffic 104a. Similarly, the first malicious network traffic 104a may be introduced to a second testing computing device 160. The second testing computing device 160 may simulate a scenario where a second security protocol 172 is implemented to address the first malicious network traffic 104a. The second testing device 160 may determine the outcome of what would happen if the second security protocol 172 is used to address the first malicious network traffic 104a. Similar operations may be performed for each sample of malicious network traffic 104 and multiple scenarios where different security protocols 172 are tested may be simulated across multiple testing devices 160. In this manner, an updated security protocol 172 for each malicious network traffic 104a-n may be determined. In this way, a more optimal security protocol 172 may be determined based on simulating and testing multiple security protocols 172, where the more optimal security protocol 172 is configured to address and remedy a given malicious network traffic 104 more efficiently and effectively compared to other simulated security protocols 172. The testing computing devices 160 may communicate the updated security protocols 172 to the server 140. The server 140 may update the security patches 159a-n based on the updated security protocols 172.

In some embodiments, the server 140 may proactively detect a cyberattack 104 based on the training dataset 154 and initial physical and digital impressions of the malicious network traffic 104. For example, the server 140 may remotely scan user devices 120 to search for similar physical and/or digital impressions of the cyberattack 104. If a corresponding digital and/or digital impression is found in a user device 120, the server 140 may cause execution, deployment, and installation of the security patch 159 associated with the cyberattack 104 on the user device 120.

In some embodiments, the server 140 may communicate updated security patch 159 and cause the execution of an updated security patch 159 to user devices 120 to immune the user devices 120 from the cyberattacks 104. In some embodiments, the server 140 may implement a firewall protocol/policy across user devices 102 to block such cyberattacks 104.

Generating a Visual Representation of the Malicious Network Traffic and Possible Mitigation Plans The server 140 may generate visual representations 222 of scenarios 228a-n where network traffic 104 are introduced to a user device 120, an entire trajectory, life cycle, and effects of the network traffic 104 on a network infrastructure 224 of an organization (where the user device 120 is a part of), and outcome of different mitigation plans 226a-n to address the network traffic 104. For example, the server 140 may generate the visual representation 222 by implementing a virtual reality framework and executing the software instructions 148 that are configured with virtual reality framework. The server 140 may display the visual representation 222 in the virtual environment 220, where virtual (e.g., three-dimensional (3D)) objects can be displayed, e.g., on a virtual reality display.

The server 140 may display that the network traffic 104a is inbound to the user device 120, where the user device 120 may be connected to other devices 230 via ports a-d. For example, the server 140 may display what happens if the port a is blocked in one scenario 226, in another scenario 226 what happens if port b is blocked, in another scenario 226 what happens if port c is blocked, and in another scenario 226 what happens if port d is blocked in the network architecture 224. The server 140 may determine different mitigation plans 226a-n for the different scenarios 228a-n to address and remedy the network traffic 104. The server 140 may provide a recommendation of the mitigation plans 226a-n to users. The users can view, update, override, or confirm the recommended mitigation plans 226a-on the virtual representation.

Method for Deploying a Security Patch to Address a Malicious Network Traffic

Figure 3:
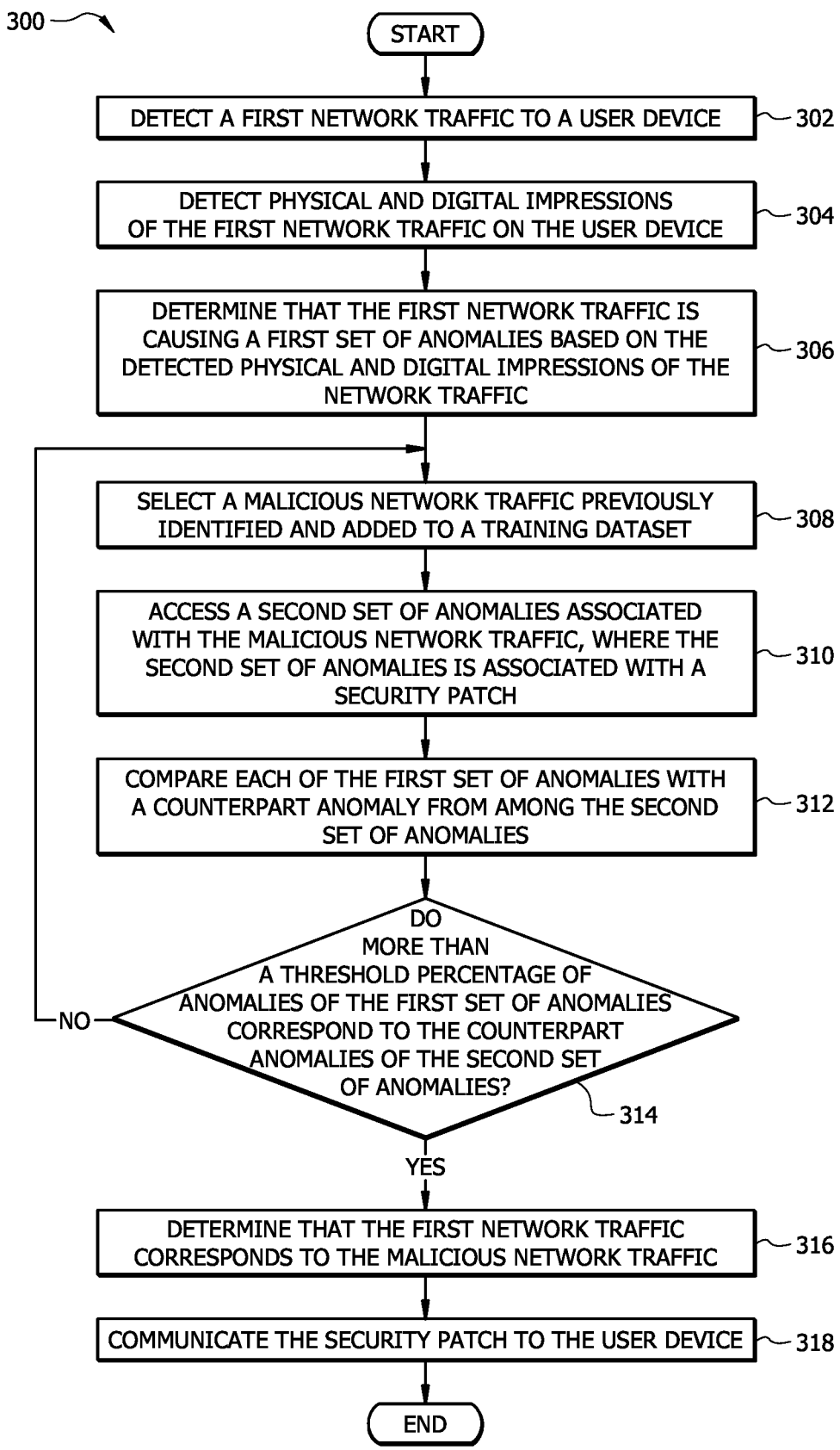
FIG. 3 illustrates an example flowchart of a method to detect malicious network traffic and deploy a security patch that is determined to address and remedy the malicious network traffic.

FIG. 3 illustrates an example flowchart of a method 300 for deploying a security patch 159 to address a malicious network traffic 104 according to some embodiments of the present disclosure. Modifications, additions, or omissions may be made to method 300. Method 300 may include more, fewer, or other operations. For example, operations may be performed in parallel or in any suitable order. While at times discussed as the system 100, server 140, user device 120, or components of any of thereof performing operations, any suitable system or components of the system may perform one or more operations of the method 300. For example, one or more operations of method 300 may be implemented, at least in part, in the form of software instructions 148 of FIG. 1, stored on tangible non-transitory computer-readable medium (e.g., memory 128, 146 of FIG. 1) that when run by one or more processors (e.g., processor 122, 142 of FIG. 1) may cause the one or more processors to perform operations 302-318.

At operation 302, the server 140 and/or the user device 120 may detect a first network traffic 104a to the user device 120. For example, the user device 120 may detect the network traffic 104a using the network interface 124. In another example, the server 140 may monitor inbound and outbound data to and from the user device 120 and in response detect the network traffic 104a.

At operation 304, the server 140 and/or user device 120 may detect physical and digital impressions 232 of the network traffic 104a on the user device 120. For example, the user device 120 may detect the physical and digital impressions/effects 232 of the network traffic 104a based on the sensor data 132, similar to that described in FIGS. 1 and 2. In another example, the user device 120 may send the sensor data 132 to the server 140, and the server 140 may detect the physical and digital impressions 232 of the network traffic 104a based on the sensor data 132, similar to that described in FIGS. 1 and 2.

At operation 306, the server 140 and/or user device 120 may determine that the first network traffic 104a is causing the first set of anomalies 214a based on the detected physical and digital impressions 232 of the network traffic 104a. For example, the user device 120 may determine that the network traffic 104a is causing the first set of anomalies 214a based on the sensor data 132 and the baseline machine state 138, similar to that described in FIGS. 1 and 2. In another example, the user device 120 may send the sensor data 132 and baseline machine state 138 to the server 140, and the server 140 may determine that the network traffic 104a is causing the first set of anomalies 214a based on the sensor data 132 and the baseline machine state 138, similar to that described in FIGS. 1 and 2.

At operation 308, the server 140 may select a malicious network traffic 104 that is previously identified and added to the training dataset 154. The server 140 may iteratively select a malicious network traffic 104 until no entry in the training dataset 154 is left for evaluation. For example, assume that the server 140 selects the network traffic 104b.

At operation 310, the server 140 accesses a second set of anomalies 214b associated with the malicious network traffic 104b, where the second set of anomalies 214b is associated with the security patch 159b. At operation 312, the server 140 compares each of the first set of anomalies 214a with the counterpart anomaly from among the second set of anomalies 214b. In this process, the server 140 may implement the machine learning algorithm 152. The server 140 may determine the anomaly vectors 210a and 210b and compare them to each other, similar to that described in FIG. 2.

At operation 314, the server 140 may determine whether more than a threshold percentage of anomalies of the first set of anomalies 214a correspond to the counterpart anomalies of the second set of anomalies 214b. In this process, the server 140 may determine a similarity score between the anomaly vectors 210a and 201b by determining an Euclidean distance between the anomaly vectors 210a and 210b. If it is determined that the Euclidean distance between the anomaly vectors 210a and 210b is less than a threshold distance (e.g., less than 0.1, 0.2, etc.), the server 140 may determine that more than a threshold percentage of anomalies of the first set of anomalies 214a correspond to the counterpart anomalies of the second set of anomalies 214b. If it is determined that the more than a threshold percentage of anomalies of the first set of anomalies 214a correspond to the counterpart anomalies of the second set of anomalies 214b, method 300 may proceed to operation 316. Otherwise, method 300 may return to operation 308 where another entry of the training dataset is selected for evaluation.

At operation 316, the server 140 may determine that the first network traffic 104a corresponds to the malicious network traffic 104b. At operation 318, the server 140 may communicate the security patch 159b to the user device 120. In some embodiments, the server 140 may cause the execution of the security patch 159b on the user device 120, similar to that described in FIG. 2. In some embodiments, the server 140 communicates an instruction 240 that causes the security patch 159b to be executed on the user device 120, similar to that described in FIG. 2. In some embodiments, the user device 120 may execute the security patch 159b on itself.

Figure 4:
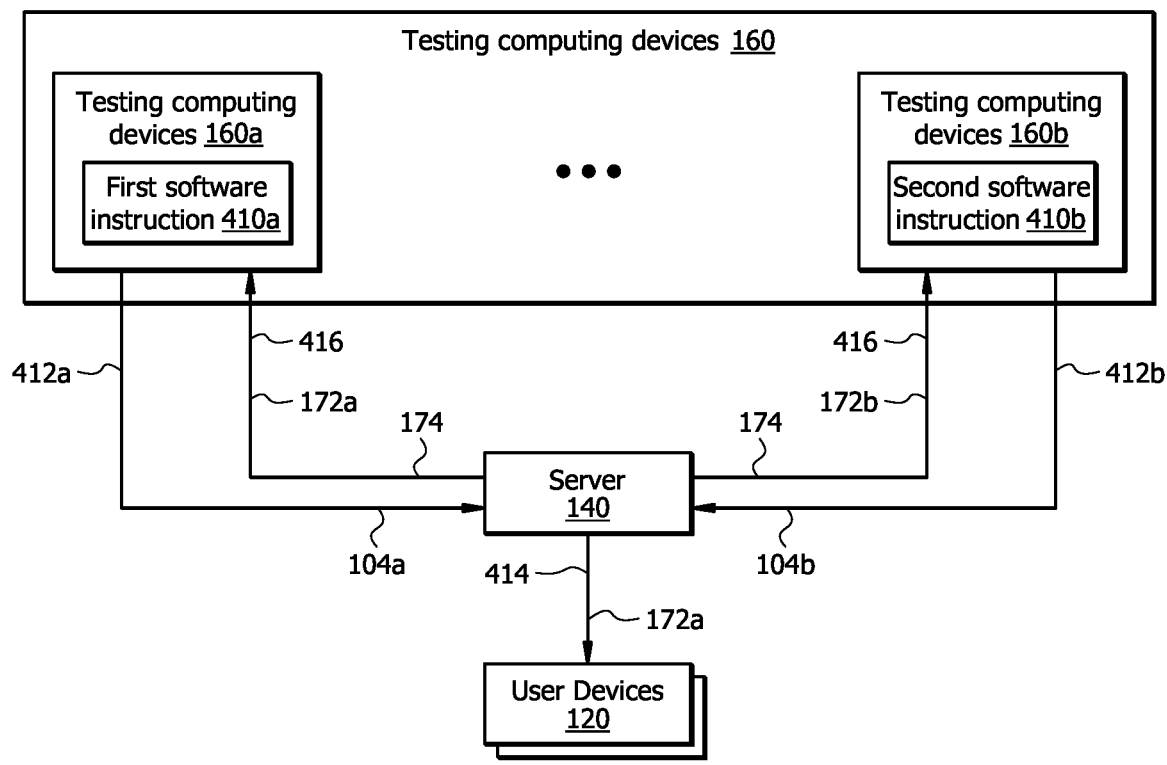
FIG. 4 illustrates an example operational flow of the system of FIG. 1 for determining a security patch for a cyberattack by executing simulations of different security protocols.

Operational Flow for Detecting a Security Protocol for a Cyberattack Based on Simulations Across Multiple Testing Computing Devices FIG. 4 illustrates an operational flow 400 of system 100 (see FIG. 1) for detecting a security protocol 172 to address and remedy a cyberattack 104 based on simulations across multiple testing computing devices 160a-b. In operation, the operational flow 400 may begin when the server 140 communicates information associated with a given malicious network traffic 104 (e.g., in the example of FIG. 4, malicious network traffic 104a) to the testing computing devices 160a-b. For example, the server 140 may communicate the network traffic information 174 associated with the malicious network traffic 104a and/or the data packets associated with the malicious network traffic 104a to the testing computing devices 106. The network traffic information 174 may include information related to data packets that form the malicious network traffic 104a and the like. The testing computing devices 160 may include any number of computing devices 160. For example, the testing computing devices 160 may include testing computing devices 160a and 160b.

In the example of FIG. 4, the server 140 may communicate the network traffic information 174 associated with malicious network traffic 104a to the first testing computing device 160a. In certain embodiments, the server 140 may also communicate the first security protocol 172a to the first testing computing device 160a. In certain embodiments, the first testing computing device 160a may receive or access the first security protocol 172a from any source, such as a user.

In certain embodiments, the server 140 may simulate a first scenario where the first security protocol 172a is executed on the first testing computing device 160a. In other words, the server 140 may cause the execution of the first security protocol 172a on the first testing computing device 160a. The first security protocol 172a may include and/or be associated with a software instruction 410a. The first security protocol 172 may be configured to implement (e.g., deploy, execute, and install) the software instructions 410a to address (and remedy and counter) an effect of the first malicious network traffic 104a on the first testing computing device 160a. For example, the software instructions 410a may include code that is configured to address (and remedy and counter) the effect of the first malicious network traffic 104a. The first security protocol 172a may correspond to and/or be associated with the security patch 159a (see FIG. 2) that is associated with the network traffic 104a. For example, the first security protocol 172a may be determined based on the operational flow 200 described in FIG. 2.

Figure 5:
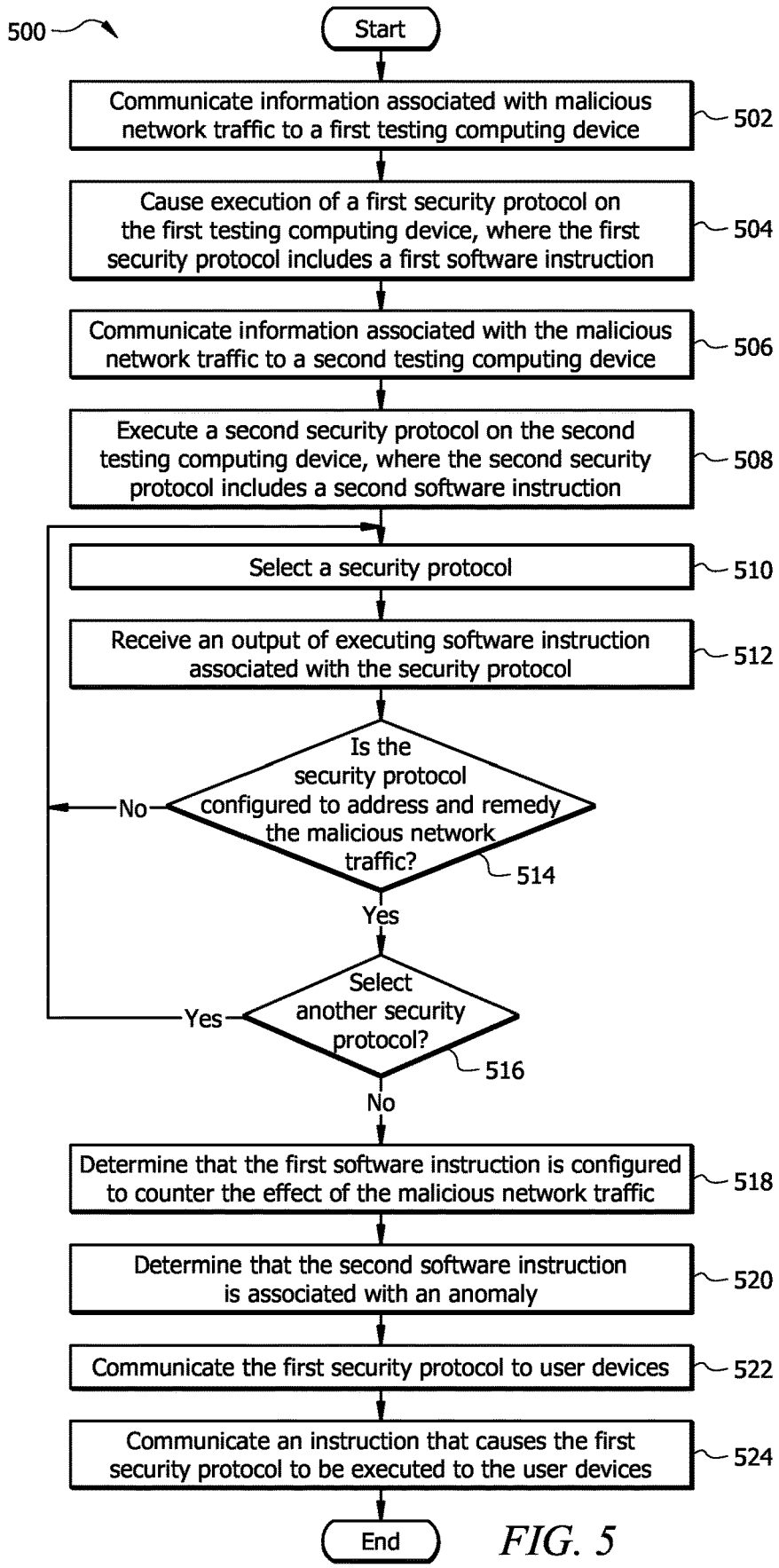
FIG. 5 illustrates an example flowchart of a method to determine a security patch for a cyberattack by executing simulations of different security protocols.

In certain embodiments, the testing computing device 160a may execute the first security protocol 172a and first software instructions 410a on itself in response to receiving the first security protocol 172a and a command to execute the first security protocol 172a from the server 140. In the example of FIG. 5, the first software instructions 410a may include a first instruction to identify a security vulnerability in a piece of code associated with an operating system of the first testing computing device 160a and a second instruction to replace the piece of code with an updated piece of code that is configured to resolve the security vulnerability. The identified piece of code may be used by the malicious network traffic 104a to, for example, access, modify, and/or exfiltrate information stored in the first testing computing device 160a. In some examples, the identified price of code may be associated with any security vulnerability, such as a weak authentication method and the like to gain at least partial control over data and/or operations of the first testing computing device 160a.

The testing computing device 160a may provide an output 412a. For example, the testing computing device 160a may provide the output 412a to the server 140. The output 412a may indicate the outcome of executing the software instructions 410a on the first testing computing device 160a. For example, the output 412a may indicate whether executing the software instructions 410a addresses, remedies, and counters the effect of the first malicious network traffic 104a. The output 412a may indicate the results of executing the software instructions 410a at one or more datapoints and data breaks on a software code/module at the testing computing device 160a. The server 140 may determine whether the first security protocol 172a is configured to address, remedy, and counter the effect of the first malicious network traffic 104a based on the output 412a, for example, by removing a security vulnerability in a piece of code associated with an operating system of the first testing computing device 160a.

The server 140 may perform similar operations with respect to the second security protocol 172b. For example, the server 140 may communicate the malicious network traffic 104a to the second testing computing device 160b. In certain embodiments, the server 140 may also communicate the network traffic information 174 associated with the malicious network traffic 104a and/or second security protocol 172b to the second testing computing device 160b. In certain embodiments, the second testing computing device 160b may receive or access the second security protocol 172b from any source, such as a user. In certain embodiments, the server 140 may simulate a second scenario where the second security protocol 172b is executed on the second testing computing device 160b. In other words, the server 140 may cause the execution (e.g., deployment and installation) of the second security protocol 172b on the second testing computing device 160b. The second security protocol 172b may include and/or be associated with a software instruction 410b. The second security protocol 172b may be configured to implement (e.g., deploy, execute, and install) the software instructions 410b to address (and remedy and counter) an effect of the first malicious network traffic 104a on the second testing computing device 160b. In the example of FIG. 5, the second security protocol 172b and software instructions 410b may be associated with an anomaly. For example, the second security protocol 172b and software instructions 410b may be incompatible with an operating system associated with and installed on the second testing computing device 160b. In the same or another example, the second security protocol 172b and software instructions 410b may cause instability in the operating system and/or in an operation of the second testing computing device 160b. In the same or another example, the second security protocol 172b and software instructions 410b may not fully address and remedy the effect of the first malicious network traffic 104a. In certain embodiments, the testing computing device 160b may execute the second security protocol 172b and software instructions 410b on itself in response to receiving the second security protocol 172b and a command to execute the second security protocol 172b from the server 140.

The testing computing device 160b may provide an output 412b. For example, the testing computing device 160b may provide the output 412b to the server 140. The output 412b may indicate the outcome of executing the software instructions 410b on the second testing computing device 160b. For example, the output 412b may indicate whether executing the software instructions 410b is configured to address, remedy, and counter the effect of the first malicious network traffic 104a. The output 412b may indicate the results of executing the software instructions 410b at one or more datapoints and data breaks on a software code/module at the testing computing device 160b. The server 140 may determine whether the second security protocol 172b is configured to address, remedy, and counter the effect of the first malicious network traffic 104a based on the output 412b. The server 140 may perform similar operations on any number of testing computing devices 160 and test different security protocols.

In the example of FIG. 5, the server 140 may determine that the first software instruction 410a is configured to counter the effect of the first malicious network traffic 104a based on the output 412a. The server 140 may also determine that the second software instruction 410b is associated with an anomaly based on analyzing the output 412b, similar to that described above. For example, server 140 may also determine that the second software instruction 410b is associated with an anomaly is in conjunction with determining that the second software instruction 410b is incompatible with the operating system associated with the second testing computing device 160b, e.g., based on analyzing the output 412b. In the same or another example, server 140 may determine that the second software instruction 410b is associated with an anomaly in conjunction with determining that the second software instruction 410b causes instability in the operation of the second testing computing device 160b. In this manner, the server 140 may compare the security protocols 172a-b and software instructions 410a-b with each other to determine which security protocol 172a-b and respective software instruction 410a-b is a more optimal solution in addressing, remedying, and countering the malicious network traffic 104a. The server 140 may select a security protocol 172 that is more optimal in addressing, remedying, and countering the malicious network traffic 104a. In the example of FIG. 5, the server 140 may select the security protocol 172a based on determining that the first software instruction 410a is configured to counter and/or counters the effect of the first malicious network traffic 104a and that the second software instruction 410b is associated with the anomaly. In response, the server 140 may communicate the first security protocol 172a to user devices 120. The server 140 may also communicate instructions 414 that cause the first security protocol 172a to be executed on the user devices 120.

In some examples, the user devices 120 may be devices that are suspected to be targets for the malicious network traffic 104a. In some examples, the user devices 120 may be devices where the malicious network traffic 104a is present and detected. In some examples, the user devices 120 may be devices where the malicious network traffic 104a is not present. The server 140 may update the security patch 159a based on the security protocol 172.

Method for Detecting a Security Protocol for a Cyberattack Based on Simulations Across Multiple Testing Computing Devices FIG. 5 illustrates an example flowchart of a method 500 for determining a security protocol 172 for a cyberattack 104 according to some embodiments of the present disclosure. Modifications, additions, or omissions may be made to method 500. Method 500 may include more, fewer, or other operations. For example, operations may be performed in parallel or in any suitable order. While at times discussed as the system 100, server 140, user device 120, testing computing devices 160, or components of any of thereof performing operations, any suitable system or components of the system may perform one or more operations of the method 500. For example, one or more operations of method 500 may be implemented, at least in part, in the form of software instructions 130, 148, 168 of FIG. 1, stored on non-transitory, tangible, machine-readable media (e.g., memory 128, 146, 166 of FIG. 1) that when run by one or more processors (e.g., processor 122, 142, 162 of FIG. 1) may cause the one or more processors to perform operations 502-524.

At operation 502, the server 140 communicates information associated with malicious network traffic 104a (e.g., network traffic information 174) to a first testing computing device 160a, similar to that described in FIG. 4. At operation 504, the server 140 causes execution of a first security protocol 172a on the first testing computing device 160a, where the first security protocol 172a includes a first software instruction 410a, similar to that described in FIG. 4. For example, the server 140 may communicate a command 416 that triggers the execution of the first security protocol 172a to the testing computing device 160a.

At operation 506, the server 140 communicates information associated with malicious network traffic 104a (e.g., network traffic information 174) to a second testing computing device 160b, similar to that described in FIG. 4. At operation 508, the server 140 causes execution of a second security protocol 172b on the second testing computing device 160b, similar to that described in FIG. 2. For example, the server 140 may communicate a command 416 that triggers the execution of the second security protocol 172b to the testing computing device 160b.

At operation 510, the server 140 selects a security protocol 172a-b. The server 140 may iteratively select a security protocol 172a-b until no security protocol 172 is left for evaluation. At operation 512, the server 140 receives an output 412a-b of executing the software instruction 410a-b associated with the security protocol 172a-b.

At operation 514, the server 140 determines whether the security protocol 172a-b is configured to address and remedy the malicious network traffic 104a. For example, the server 140 may analyze the output 412a-b. If it is determined that the security protocol 172*a-b* is configured to address and remedy the malicious network traffic 104*a*, method 500 proceeds to operation 516. Otherwise, method 500 returns to operation 510.

At operation 516, the server 140 determines whether to select another security protocol 172*a-b*. The server 140 determines to select another security protocol 172*a-b* if at least one security protocol 172*a-b* is left for evaluation. If it is determined to select another security protocol 172*a-b*, method 500 returns to operation 510. Otherwise, method 500 proceeds to operation 518.

At operation 518, the server 140 determines that the first software instruction 410*a* is configured to counter the effect of the malicious network traffic 104*a*, similar to that described in FIG. 4. At operation 520, the server 140 determines that the second software instruction 410*b* is associated with an anomaly, similar to that described in FIG. 4.

At operation 522, the server 140 communicates the first security protocol 172*a* to user devices 120. At operation 524, the server 140 communicates the instructions 414 that cause the first security protocol 172*a* to be executed to the user devices 120.

In some embodiments, the server 140 may perform similar operations for any number of security protocols and/or any malicious network traffic 104. For example, the server 140 may communicate a second malicious network traffic 104 to the first testing computing device 160*a*. The server 140 may trigger/cause the execution of a third security protocol 172 on the first testing computing device 160*a*, where the third security protocol 172 is configured to implement a third software instruction 410 to address an effect of the second malicious network traffic 104 on the first testing computing device 160*a*. The server 140 may communicate the second malicious network traffic 104 to the second testing computing device 160*b*. The server 140 may trigger the execution of the fourth security protocol 172 on the second testing computing device 160*b*, where the fourth security protocol 172 is configured to implement a fourth software instruction 410 to address the effect of the second malicious network traffic 104 on the second testing computing device 160*b*. The server 140 may determine evaluate each of the third and fourth software instructions 410. For example, the server 140 may determine whether the third software instruction 410 is configured to counter the effect of the second malicious network traffic 104. In this example, the server 140 determines that the third software instruction 410 is configured to counter the effect of the second malicious network traffic 104, e.g., by removing a second security vulnerability in a second piece of code associated with the operating system of the second testing computing device 160*b*. In this example, regarding the fourth software instruction 410, the server 140 determines that the fourth software instruction 410 is associated with the anomaly. For example, determining that the fourth software instruction 410 is associated with the anomaly is in conjunction with determining that the fourth software instruction 410 is incompatible with an operating system associated with the second testing computing device 160*b* and/or determining that the fourth software instruction 410 causes instability in an operation of the second testing computing device 160*b*. In response to determining that the third software instruction 410 is configured to counter the effect of the second malicious network traffic 104 and that the fourth software instruction 410 is associated with the anomaly, the server 140 may communicate the second security protocol 172 to the user devices 120. The server 140 may also communicate the instruction 414 that causes the second security protocol 172 to be executed on the user devices 120 to the user devices 120.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for detecting and addressing security threats, comprising:
    a memory configured to store a plurality of anomaly data comprising first anomaly data associated with a first malicious network traffic, wherein:
        the first anomaly data is further associated with a first security patch, and
        the first anomaly data indicates a first set of anomalies caused by the first malicious network traffic; and
    a processor operably coupled with the memory, and configured to:
        detect incoming network traffic to a computing device;
        detect at least one of physical or digital effects of the incoming network traffic on the computing device;
        determine that the incoming network traffic is causing a second set of anomalies based at least in part upon the at least one of detected physical or digital effects;
        compare each of the second set of anomalies with a counterpart anomaly from among the first set of anomalies;
        determine that more than a threshold percentage of anomalies from among the second set of anomalies correspond to counterpart anomalies from among the first set of anomalies; and
        in response to the determining that more than the threshold percentage of anomalies from among the second set of anomalies correspond to the counterpart anomalies from among the first set of anomalies:
            communicate the first security patch to the computing device; and
            communicate an instruction that causes the first security patch to be executed on the computing device.

2. The system of claim 1, wherein the processor is further configured to implement a firewall protocol to block the incoming network traffic.

3. The system of claim 1, wherein the second set of anomalies comprises at least one of an increase in thermal reading, induced electromagnetic field, an increase in fan speed, an increase in electricity consumption amount, an increase in memory utilization percentage, an increase in hard disk storage usage, or an increase in central processing unit (CPU) utilization percentage.

4. The system of claim 1, wherein determining that the incoming network traffic is causing the second set of anomalies is in response to:
   comparing the at least one of physical or digital effects with a baseline machine state, wherein the baseline machine state indicates physical and digital attributes of the computing device under conditions when no malicious network traffic is introduced to the computing device; and
   determining that at least one of physical or digital attributes of the computing device deviates from the baseline machine state.

5. The system of claim 1, wherein the processor is further configured to:
   in response to the determining that more than the threshold percentage of anomalies from among the second set of anomalies correspond to the counterpart anomalies from among the first set of anomalies:
      scan a plurality of computing devices for the second set of anomalies;
      detect that the second set of anomalies is found in at least one of the plurality of computing devices; and
      communicate the first security patch to the at least one of the plurality of computing devices.

6. The system of claim 1, wherein:
   the processor is further configured, before the detecting the at least one of physical or digital effects of the incoming network traffic on the computing device, to receive sensor data from at least one sensor associated with the computing device, wherein:
      the sensor data indicates physical and digital attributes of the computing device; and
      the sensor data comprises thermal reading, fan speed, electricity consumption amount, memory utilization percentage, hard disk usage, and central processing unit (CPU) utilization percentage; and
   detecting the at least one of physical or digital effects of the incoming network traffic on the computing device is based at least in part upon the sensor data.

7. The system of claim 1, wherein the processor is further configured to:
   in response to the determining that the incoming network traffic is causing the second set of anomalies:
      generate a first unique identifier identifying the second set of anomalies and the incoming network traffic, wherein the first unique identifier is generated by encoding data representing the second set of anomalies into a virtual image;
      store the first unique identifier associated with the second set of anomalies in the memory; and
      train a machine learning algorithm to detect malicious network traffic by using the first unique identifier as a training dataset.

8. A method for detecting and addressing security threats, comprising:
   storing a plurality of anomaly data comprising first anomaly data associated with a first malicious network traffic, wherein:
      the first anomaly data is further associated with a first security patch, and
      the first anomaly data indicates a first set of anomalies caused by the first malicious network traffic;
   detecting incoming network traffic to a computing device;
   detecting at least one of physical or digital effects of the incoming network traffic on the computing device;
   determining that the incoming network traffic is causing a second set of anomalies based at least in part upon the at least one of detected physical or digital effects;
   comparing each of the second set of anomalies with a counterpart anomaly from among the first set of anomalies;
   determining that more than a threshold percentage of anomalies from among the second set of anomalies correspond to counterpart anomalies from among the first set of anomalies; and
   in response to the determining that more than the threshold percentage of anomalies from among the second set of anomalies correspond to the counterpart anomalies from among the first set of anomalies:
      communicating the first security patch to the computing device; and
      communicating an instruction that causes the first security patch to be executed on the computing device.

9. The method of claim 8, further comprising implementing a firewall protocol to block the incoming network traffic.

10. The method of claim 8, wherein the second set of anomalies comprises at least one of an increase in thermal reading, induced electromagnetic field, an increase in fan speed, an increase in electricity consumption amount, an increase in memory utilization percentage, an increase in hard disk storage usage, or an increase in central processing unit (CPU) utilization percentage.

11. The method of claim 8, wherein determining that the incoming network traffic is causing the second set of anomalies is in response to:
   comparing the at least one of physical or digital effects with a baseline machine state, wherein the baseline machine state indicates physical and digital attributes of the computing device under conditions when no malicious network traffic is introduced to the computing device; and
   determining that at least one of physical or digital attributes of the computing device deviates from the baseline machine state.

12. The method of claim 8, further comprising:
   in response to the determining that more than the threshold percentage of anomalies from among the second set of anomalies correspond to the counterpart anomalies from among the first set of anomalies:
      scanning a plurality of computing devices for the second set of anomalies;
      detecting that the second set of anomalies is found in at least one of the plurality of computing devices; and
      communicating the first security patch to the at least one of the plurality of computing devices.

13. The method of claim 8, wherein:
   the method further comprises, before the detecting the at least one of physical or digital effects of the incoming network traffic on the computing device, receiving sensor data from at least one sensor associated with the computing device, wherein:

the sensor data indicates physical and digital attributes of the computing device; and the sensor data comprises thermal reading, fan speed, electricity consumption amount, memory utilization percentage, hard disk usage, and central processing unit (CPU) utilization percentage; and detecting the at least one of physical or digital effects of the incoming network traffic on the computing device is based at least in part upon the sensor data.

14. The method of claim 8, further comprising:

in response to the determining that the incoming network traffic is causing the second set of anomalies:

generating a first unique identifier identifying the second set of anomalies and the incoming network traffic, wherein the first unique identifier is generated by encoding second anomaly data representing the second set of anomalies into a virtual image;

storing the first unique identifier associated with the second set of anomalies in a memory; and training a machine learning algorithm to detect malicious network traffic by using the first unique identifier as a training dataset.

15. A non-transitory computer-readable medium storing instructions that when executed by a processor, cause the processor to:

store a plurality of anomaly data comprising first anomaly data associated with a first malicious network traffic, wherein:

the first anomaly data is further associated with a first security patch, and the first anomaly data indicates a first set of anomalies caused by the first malicious network traffic;

detect incoming network traffic to a computing device;

detect at least one of physical or digital effects of the incoming network traffic on the computing device;

determine that the incoming network traffic is causing a second set of anomalies based at least in part upon the at least one of detected physical or digital effects;

compare each of the second set of anomalies with a counterpart anomaly from among the first set of anomalies;

determine that more than a threshold percentage of anomalies from among the second set of anomalies correspond to counterpart anomalies from among the first set of anomalies; and in response to the determining that more than the threshold percentage of anomalies from among the second set of anomalies correspond to the counterpart anomalies from among the first set of anomalies:

communicate the first security patch to the computing device; and communicate an instruction that causes the first security patch to be executed on the computing device.

16. The non-transitory computer-readable medium of claim 15, wherein the instructions further cause the processor to implement a firewall protocol to block the incoming network traffic.

17. The non-transitory computer-readable medium of claim 15, wherein the second set of anomalies comprises at least one of an increase in thermal reading, induced electromagnetic field, an increase in fan speed, an increase in electricity consumption amount, an increase in memory utilization percentage, an increase in hard disk storage usage, or an increase in central processing unit (CPU) utilization percentage.

18. The non-transitory computer-readable medium of claim 15, wherein determining that the incoming network traffic is causing the second set of anomalies is in response to:

comparing the at least one of physical or digital effects with a baseline machine state, wherein the baseline machine state indicates physical and digital attributes of the computing device under conditions when no malicious network traffic is introduced to the computing device; and determining that at least one of physical or digital attributes of the computing device deviates from the baseline machine state.

19. The non-transitory computer-readable medium of claim 15, wherein the instructions further cause the processor to:

in response to the determining that more than the threshold percentage of anomalies from among the second set of anomalies correspond to the counterpart anomalies from among the first set of anomalies:

scan a plurality of computing devices for the second set of anomalies;

detect that the second set of anomalies is found in at least one of the plurality of computing devices; and communicate the first security patch to the at least one of the plurality of computing devices.

20. The non-transitory computer-readable medium of claim 15, wherein:

the instructions further cause the processor, before the detecting the at least one of physical or digital effects of the incoming network traffic on the computing device, to receive sensor data from at least one sensor associated with the computing device, wherein:

the sensor data indicates physical and digital attributes of the computing device; and the sensor data comprises thermal reading, fan speed, electricity consumption amount, memory utilization percentage, hard disk usage, and central processing unit (CPU) utilization percentage; and detecting the at least one of physical or digital effects of the incoming network traffic on the computing device is based at least in part upon the sensor data.

* * * * *